Aug. 8, 1933.  A. C. VAN HOOYDONK  1,921,996
PISTON CONSTRUCTION
Filed July 30, 1932
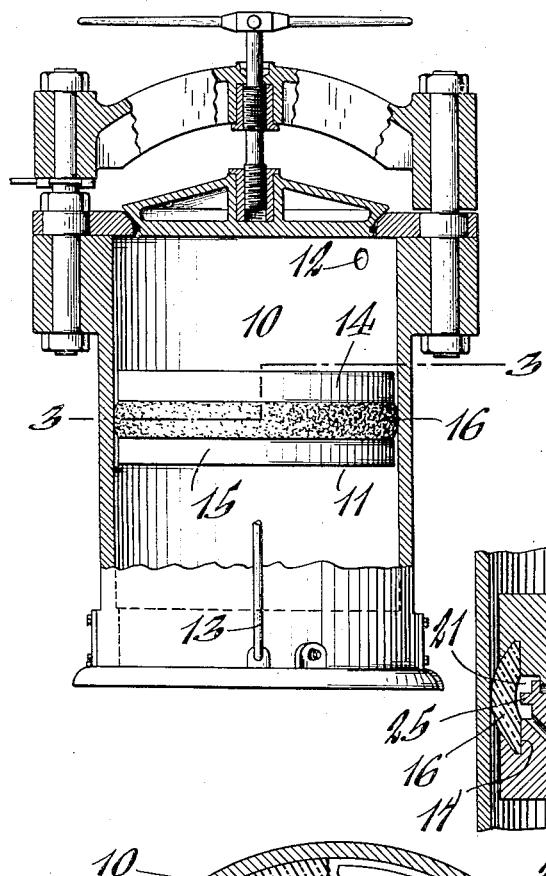
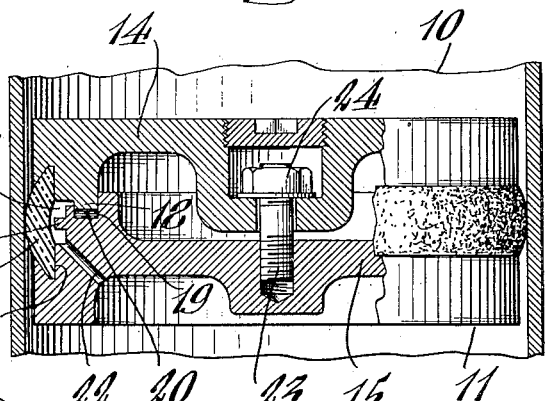

Patented Aug. 8, 1933

1,921,996

UNITED STATES PATENT OFFICE 1,921,996

PISTON CONSTRUCTION

Adrian C. Van Hooydonk, Buffalo, N. Y., assignor to John E. Smith's Sons Company, Buffalo, N. Y., a Corporation of New York Application July 30, 1932. Serial No. 626,267

3 Claims. (Cl. 74—108)

This invention relates to improvements in piston or plunger construction and more particularly to the pistons which are commonly used in sausage stuffing machines.

One of its objects is to so improve the construction of the piston as to prevent the compressible packing or rubber ring from being displaced inwardly out of its normal operative sealing position.

Another object of the invention is to provide a piston construction of this character which is simple, compact and inexpensive in construction, and whose packing ring is so disposed as to prevent danger of leakage between the cylinder-wall and the piston.

In the accompanying drawing:—Figure 1 is a sectional side view of a sausage stuffer equipped with my improved piston. Figure 2 is an enlarged sectional elevation of the piston in its cylinder. Figure 3 is a horizontal section taken on line 3—3, Figure 1.

Similar characters of reference indicate corresponding parts throughout the several views.

In the stuffer shown in the drawing, by way of example, 10 indicates the customary upright cylinder for receiving the meat-dough or other plastic material and 11 indicates the piston or plunger which is freely operable in the cylinder for ejecting the meat-dough therefrom on its upstroke through the customary discharge openings in the cylinder, one being indicated at 12. The lower end of the cylinder is closed and leading thereto is a pipe 13 for admitting the motive fluid under pressure to the cylinder for raising the piston to eject the contents therefrom. The upper end of the cylinder may be provided with any suitable closure means, but as the closure forms no part of the present invention, a description thereof is not deemed necessary.

In the preferred construction of the piston shown in the drawing, the same comprises upper and lower sections 14 and 15, respectively, which are circular in form to fit loosely within the cylinder and between which, at the peripheries thereof, is arranged a compressible packing in the form of a rubber or like ring 16 to provide a leak-proof joint or seal between the piston and the cylinder-wall. This packing ring is preferably provided with an outer convex bearing face and the opposing faces of the piston-sections are provided adjacent their marginal edges with substantially V-shaped seats or recesses 17 for receiving the correspondingly shaped upper and lower marginal edges of the packing ring, as shown in Figure 2. The bottom face of the upper piston-section 14 is provided inwardly of its periphery with an annular rib or flange 18 which is adapted to engage a corresponding groove or recess 19 formed in the opposing top face of the lower piston-section 15. One or more gaskets 20 are adapted to be arranged between the companion flange and groove of the piston-sections for adjusting the sections vertically relatively to each other to in turn effect the proper adjustment of the compressible ring 16 to insure a leak-proof joint between this ring and the cylinder-wall. Should the piston leak, one or more of the gaskets 20 are removed which results in the piston-sections being brought closer together, while the compressible ring is accordingly expanded outwardly in firm contact with the cylinder-wall. Should the piston be too tight in the cylinder, additional gaskets are added to increase the separation between the sections and accordingly reduce the expansion of the rubber ring.

Disposed outwardly of the companion flange and grooves 18 and 19 of the piston-sections between the opposing faces of the latter and between the inside face of the packing ring 16 and the periphery of the reduced upper portion of the lower piston-section 15 is an annular space or chamber 21. Communicating with this chamber and formed in the lower piston-section are ports 22 into which a portion of the fluid employed for operating the piston upwardly in its cylinder is adapted to pass for exerting a pressure on the inner face of the packing ring 16 and forcing it outwardly against the cylinder wall.

The piston-sections may be joined together in any suitable manner whereby they can be readily disconnected to effect the replacement of the compressible packing ring 16 and gaskets 20 when desired or necessary, the means shown in the drawing, by way of example, consisting of a screw stud 23 rising from the lower piston-section 15 and passing through an opening in the upper piston-section 14, a nut 24 being applied to the upper end of the stud to firmly clamp the sections together.

When the rubber ring 16 and gaskets 20 are in position and the piston-sections drawn together in the manner just described, the resulting pressure exerted on the top and bottom edges of the ring may have a tendency to compress the ring inwardly into the space 21 instead of compressing it outwardly into substantially convex form for insuring a tight seal between the piston and the cylinder. When this condition arises, leakage of the piston results and the proper operation of the stuffer is interfered with. To overcome these objections and to prevent the inward displacement of the packing ring, I provide the reduced upper portion of the lower piston-section 15 with an outwardly-facing rib or flange 25 which extends into the air space 21 and terminates short of the inner face of the packing ring 16 to positively limit or defeat any possibility of this ring being displaced inwardly when the same is compressed into its operative position. By this construction, a tight seal between the piston and the cylinder is assured at all times, and the danger of the inward collapse of the compressible packing ring, which would materially interfere with the proper operation of the stuffer, is positively prevented.

I claim as my invention:—

1. A piston, comprising upper and lower sections having an annular space between the same adjoining their peripheries, a compressible packing member disposed between said sections and about the space therebetween, and an annular rib formed on one of said sections and extending into said space for preventing inward displacement of the packing member into such space.

2. A piston, comprising upper and lower sections, an annular compressible packing member disposed between said sections, one of said sections having a reduced portion forming a resulting annular space between the same and the inner face of said packing member, and an annular rib projecting outwardly from the reduced portion of said piston-section and constituting an abutment for preventing the collapse of the packing member into said space.

3. A piston, comprising upper and lower sections, an annular compressible packing member disposed between said sections, one of said sections having a reduced portion forming a resulting annular space between the same and the inner face of said packing member and having an annular groove in its joint face, the companion section having an annular flange fitted in said annular groove, gaskets disposed between said sections and fitted between the companion flange and groove thereof, and an annular rib projecting outwardly from the reduced portion of said piston-section and constituting an abutment for preventing the collapse of the packing member into said space.

ADRIAN C. VAN HOOYDONK.